US012421036B2

(12) United States Patent
Wu

(10) Patent No.: US 12,421,036 B2
(45) Date of Patent: Sep. 23, 2025

(54) WAREHOUSING ROBOT

(71) Applicant: BEIJING JINGDONG QIANSHI TECHNOLOGY CO., LTD., Beijing (CN)

(72) Inventor: Mingfu Wu, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 997 days.

(21) Appl. No.: 17/606,330

(22) PCT Filed: Apr. 8, 2020

(86) PCT No.: PCT/CN2020/083685
§ 371 (c)(1),
(2) Date: Oct. 25, 2021

(87) PCT Pub. No.: WO2020/220948
PCT Pub. Date: Nov. 5, 2020

(65) Prior Publication Data
US 2022/0212867 A1 Jul. 7, 2022

(30) Foreign Application Priority Data

Apr. 30, 2019 (CN) .......................... 201910360794.5

(51) Int. Cl.
*B65G 1/04* (2006.01)
(52) U.S. Cl.
CPC .................................. *B65G 1/0492* (2013.01)
(58) Field of Classification Search
CPC ... B65G 1/0492; B65G 1/0435; B65G 1/0457
See application file for complete search history.

(56) References Cited

U.S. PATENT DOCUMENTS 10,315,898 B2 * 6/2019 Azad ....................... B66F 9/072
10,518,974 B2 * 12/2019 Lee ....................... B65G 1/0492
(Continued)

FOREIGN PATENT DOCUMENTS

CN 207174610 U * 4/2018
CN 108706265 A * 10/2018
(Continued)

OTHER PUBLICATIONS

The Extended European Search Report for European Patent Application No. 20798557.3, dated Nov. 23, 2022.
(Continued)

*Primary Examiner* — Steve Clemmons

(57) ABSTRACT

A warehousing robot, including: a climbing component and an underframe (20); the climbing component is configured to dock with a track on a shelf and drive the warehousing robot to climb along the shelf after completing a docking; and the climbing component is slidably connected with the underframe to enable the climbing component to slide relative to the underframe along a preset direction in a horizontal plane during a docking process of the climbing component and the track. Compared with the fixed connection of the climbing component and the underframe, when the distances between the warehousing robot and the two tracks are not equal, the position of the driving wheel on the climbing component can be adjusted, so that the driving wheel is docked with the track, and the climbing component will slide on the underframe without dragging the underframe to move on the ground.

18 Claims, 8 Drawing Sheets

(56) References Cited

U.S. PATENT DOCUMENTS

| | | | |
|---|---|---|---|
| 10,730,696 B2* | 8/2020 | Moulin | B65G 1/0485 |
| 10,822,169 B2* | 11/2020 | Moulin | B65G 1/065 |
| 11,142,398 B2* | 10/2021 | Lert, Jr. | B65G 1/0492 |
| 11,738,947 B2* | 8/2023 | Raizer | B65G 1/0492 |
| | | | 701/2 |
| 2005/0144194 A1* | 6/2005 | Lopez | E04H 6/285 |
| 2019/0062051 A1 | 2/2019 | Warhurst | |

FOREIGN PATENT DOCUMENTS

| | | | | |
|---|---|---|---|---|
| CN | 108706266 A | | 10/2018 | |
| CN | 208790422 U | * | 4/2019 | B65G 1/0492 |
| CN | 210437866 U | | 5/2020 | |
| FR | 3057258 A1 | * | 4/2018 | B62D 63/02 |
| JP | H6-42810 U | | 6/1994 | |
| WO | WO9203629 A1 | | 3/1992 | |
| WO | WO2010100513 A2 | | 9/2010 | |
| WO | 2018/189110 A1 | | 10/2018 | |
| WO | WO-2020010575 A1 | * | 1/2020 | B60G 3/14 |

OTHER PUBLICATIONS

The Notice of Reasons for Refual for Japanese Patent Application No. 2021-560227, dated Dec. 5, 2022.
International Search Report dated Jul. 8, 2020 for International application No. PCT/CN2020/083685.
The First Office Action dated Jun. 25, 2024 for Chinese Application No. 201910360794.5.
Notification of Registration Formalities dated Jan. 16, 2025 for Application No. 201910360794.5.

* cited by examiner

WAREHOUSING ROBOT

CROSS-REFERENCE TO RELATED APPLICATIONS

This application is a National Stage of International Application No. PCT/CN2020/083685, filed on Apr. 8, 2020, which claims priority to Chinese Patent Application No. 201910360794.5, filed to the China National Intellectual Property Administration on Apr. 30, 2019 and entitled "Warehousing Robot". The disclosures of the aforementioned applications are hereby incorporated by reference in their entireties.

TECHNICAL FIELD

The present application relates to the field of warehousing device technologies and, in particular, to a warehousing robot.

BACKGROUND

With the gradual development of warehousing technologies, at present, goods are often fetched from or placed on shelves by warehouse robots, so as to reduce workload of workers. At the same time, in order to improve utilization space of a plant, a height of a shelf is generally set to be larger, therefore, how to enable the warehousing robot to climb the shelf has become a research hotspot.

In the related art, two climbing tracks are set at an interval on the shelf, and a center line of the climbing track is perpendicular to the horizontal plane. The warehousing robot includes a climbing mechanism which can telescope and dock with the track. When in use, the warehousing robot is driven by a walking mechanism to move to a position between two equal tracks, a driving wheel at one end of the frame body is cooperated with a climbing track through the telescopic mechanism, and a driving wheel at the other end of the frame body is cooperated with the other climbing track. A driving apparatus drives two driving wheels to rotate, which can drive a whole warehousing robot to move along a direction of the height of the shelf.

However, the walking mechanism drives the warehousing robot to move to the position between the two climbing tracks, which is difficult to ensure that a center of a robot body is consistent with a center between the shelves on both sides, and it is also difficult to ensure consistency of the shelf spacing and parallelism of the shelves on both sides, causing the robot body unable to adapt, affecting its docking and climbing with the track, affecting the service life of the robot body, and even causing the robot body unable to climb to realize outbound/inbound operations.

SUMMARY

The object of the present application is to provide a warehousing robot that can adjust a position of a driving wheel on a climbing component by sildably connecting the climbing component and a underframe, so that the driving wheel is docked with the track, and the climbing component will slide on a underframe without dragging the underframe to move on the ground, thereby avoiding damage to a walking mechanism and improving the service life.

An embodiment of the present application discloses a warehousing robot, including: a climbing component and an underframe, where the climbing component is configured to dock with a track on a shelf, and drive the warehousing robot to climb along the shelf after completing a docking; and the climbing component is slidably connected with the underframe, to enable the climbing component to slide relative to the underframe along a preset direction in a horizontal plane during a docking process of the climbing component and the track.

Based on the above technical content, the climbing component is slidably connected with the underframe, when a distance between the warehousing robot and the first climbing track is not equal to a distance between the warehousing robot and the second climbing track, the position of the driving wheel on the climbing component can be adjusted, so that the driving wheel is docked with the track, and the climbing component will slide on the underframe without dragging the underframe to move on the ground, thereby avoiding damage to the walking mechanism and improving the service life.

In an implementation, the climbing component includes a body and a climbing unit, the climbing unit is arranged on the body, and the body is slidably connected with the underframe.

In an implementation, the climbing unit has a telescopic mechanism and a first driving wheel and a second driving wheel arranged along a preset direction; and the first driving wheel and the second driving wheel are arranged at both ends of the telescopic mechanism, to dock with the track under driving action of the telescopic mechanism.

The telescopic mechanism can adjust the distance between the first driving wheel and the second driving wheel by arranging the first driving wheel and the second driving wheel at both ends of the telescopic mechanism, to adapt to different shelves and improve the versatility of the warehousing robot.

In an implementation, the climbing unit includes: a first sliding part and a second sliding part, the first driving wheel is arranged on the first sliding part, and the second driving wheel is arranged on the second sliding part; and the telescopic mechanism is slidably connected with the first sliding part and the second sliding part, to drive the first sliding part and the second sliding part to move along a preset direction.

When the telescopic mechanism is working, the first sliding part and the second sliding part both move by connecting the telescopic mechanism with the first sliding part and the second sliding part, which can increase adjustment range of the distance between the first driving wheel and the second driving wheel.

In an implementation, the telescopic mechanism includes a first lead screw, a second lead screw and a driving apparatus arranged on the body, an axis of the first lead screw is parallel to the preset direction, and a first threaded hole cooperated with the first lead screw is arranged on the first sliding part; and the first lead screw is rotatably connected with the body; an axis of the second lead screw is parallel to a preset direction, and a second threaded hole cooperated with the second lead screw is arranged on the second sliding part; the second lead screw is rotatably connected with the body; and the driving apparatus is connected with the first lead screw and the second lead screw in a transmission way.

In an implementation, the driving apparatus includes: a rotating apparatus and a drive shaft, an axis of the drive shaft, the axis of the first lead screw and the axis of the second lead screw are arranged collinearly, one end of the drive shaft is connected with the first lead screw in a transmission way, the other end of the drive shaft is connected with the second lead screw in a transmission way, and the rotating apparatus is connected with the drive shaft in a transmission way.

In an implementation, the rotating apparatus is arranged on the body.

In an implementation, the climbing component includes two climbing units set at an interval along a vertical direction of the preset direction.

By arranging two climbing units, the two climbing units can jointly drive the warehousing robot to climb the shelf.

In an implementation, first driving wheels of the two climbing units are connected by a universal coupling.

In an implementation, second driving wheels of the two climbing units are connected by a universal coupling.

In an implementation, the warehousing robot further includes a sensor, configured to detect pressure to the first driving wheel and the second driving wheel from the track, to control the telescopic mechanism to telescope.

By arranging the sensor, after the first driving wheel is docked with the track and the second driving wheel is docked with the track, the telescopic mechanism is controlled to stop working, to avoid too much resisting force of the track to the first driving wheel and the second driving wheel.

In an implementation, the warehousing robot further includes a torque detection apparatus, and the torque detection apparatus is configured to detect torque of the rotating apparatus, to control the telescopic mechanism to telescope.

By arranging the torque detection apparatus, in the process of climbing the shelf, if the torque of the rotating apparatus is detected to be less than the preset torque, the distance between the first driving wheel and the second driving wheel is appropriately increased by the telescopic mechanism, to avoid the first driving wheel and the second driving wheel being separated from the corresponding track.

In an implementation, the telescopic mechanism is a non-self-locking mechanism.

In an implementation, two ends of the telescopic mechanism are provided with position-limiting parts, and the position-limiting parts are configured to cooperate with guiding parts on the shelf to realize limitation of positions of the first driving wheel and the second driving wheel along a preset direction.

By arranging the position-limiting parts, the position-limiting parts are cooperated with the guiding parts, in the process of the warehousing robot climbing the shelf, if the distance between the tracks is shortened, and then the position-limiting parts are squeezed, the distance between the first driving wheel and the second driving wheel is appropriately reduced; and if the distance between the tracks is increased, and then the position-limiting parts are pulled. The distance between the first driving wheel and the second driving wheel is appropriately increased, which can avoid the first driving wheel and the second driving wheel being separated from the track or too much squeezing force to the first driving wheel and the second driving wheel.

In an implementation, the position-limiting parts include a first guide wheel and a second guide wheel set at an interval along a preset direction, and the guiding part is sandwiched between the first guide wheel and the second guide wheel.

In an implementation, the warehousing robot further includes an elastomer, the elastomer connects with the body and the underframe, and undergoes elastic deformation when the body slides relative to the underframe along a preset direction.

By arranging the elastomer, when a relative movement between the body and the underframe occurs, the elastomer undergoes elastic deformation, and when the warehousing robot climbs the shelf to separate the underframe from the ground, the body and the underframe return to an initial position under the action of the elastic force of the elastomer.

In an implementation, the elastomer includes springs, and the number of the springs is two; and two spring connectors are set at an interval on the body along a preset direction, one end of each of the springs is connected with one of the spring connectors, and the other end of each of the springs is connected with the underframe.

In combination with the above technical solutions, for the warehousing robot of the embodiment of the present application, the climbing component is slidably connected with the underframe, and the climbing component is configured to dock with the track on the shelf, and drive the warehousing robot to climb along the shelf after completing a docking; compared with the fixed connection of the climbing component and the underframe, when the distance between the warehousing robot and the first climbing track is not equal to the distance between the warehousing robot and the second climbing track, the position of the driving wheel on the climbing component can be adjusted, so that the driving wheel is docked with the track, and the climbing component will slide on the underframe without dragging the underframe to move on the ground, thereby avoiding damage to the walking mechanism and improving the service life.

DESCRIPTION OF REFERENCE NUMBERS

1: First climbing track;
2: Second climbing track;
3: Third climbing track;
4: Fourth climbing track;
10: First climbing unit;
20: Underframe;
30: Universal coupling;
40: First driving motor;
50: Second driving motor;
60: Second climbing unit;
70: First guide wheel;
80: Second guide wheel;
101: First driving wheel;
102: Second driving wheel;

103: Body;
104: First sliding part;
105: Second sliding part;
106: First lead screw;
107: Second lead screw;
108: Drive shaft;
109: Spring;
201: Sliding rail;
601: Third driving wheel;
602: Fourth driving wheel;
1031: Bearing hole;
1032: First rolling bearing;
1033: Second rolling bearing;
1034: Backstop ring;
1035: Column;
1036: Casing pipe.
1061: Backstop part

DESCRIPTION OF EMBODIMENTS

In order to make the object, technical solutions and advantages of the embodiments of the present application clearer, the technical solutions of the embodiments of the present application will be described below clearly and completely in conjunction with the accompanying drawings of the embodiments of the present application. Apparently, the described embodiments are a part of the embodiments of the present application, but not all of the embodiments. Based on the embodiments of the present application, all other embodiments obtained by those of ordinary skilled in the art without creative effort shall fall within the protection scope of the present application.

In the present application, unless otherwise specified, the terms "install", "couple", "connect", "fix" and other terms should be interpreted broadly. For example, the connection may be fixed, detachable, or integrated, and may be mechanical, electrical or be able to communicate with each other; it may be direct connection or indirectly connected through intermediate media, and it may be internal connection between two elements or interaction between two elements, unless otherwise explicitly defined. For those of ordinary skilled in the art, the specific meanings of the above-mentioned terms of the present application can be understood according to specific circumstances.

Figure 1:
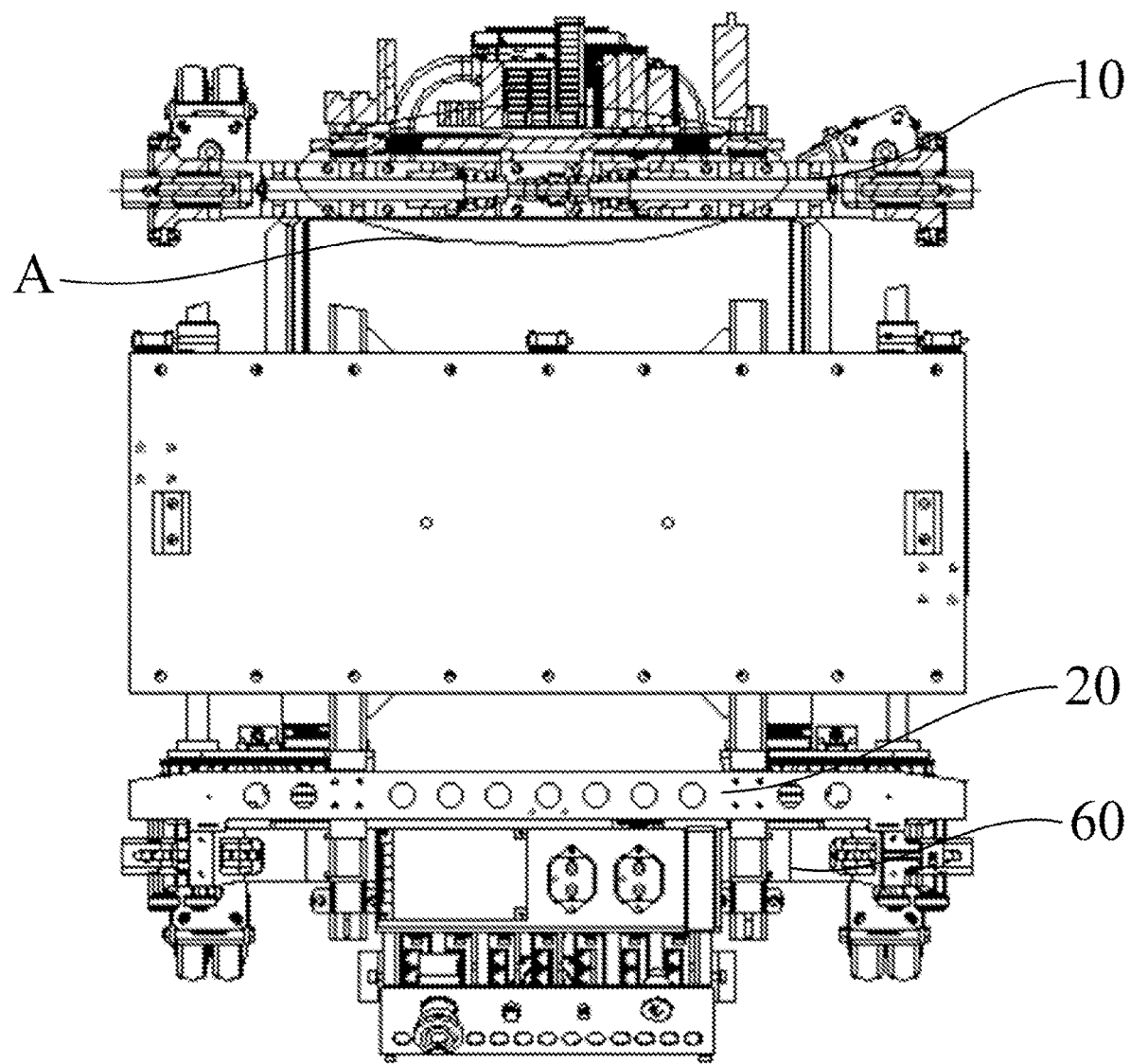
FIG. 1 is a schematic structural diagram of a warehousing robot provided by an embodiment of the present application.
Figure 2:
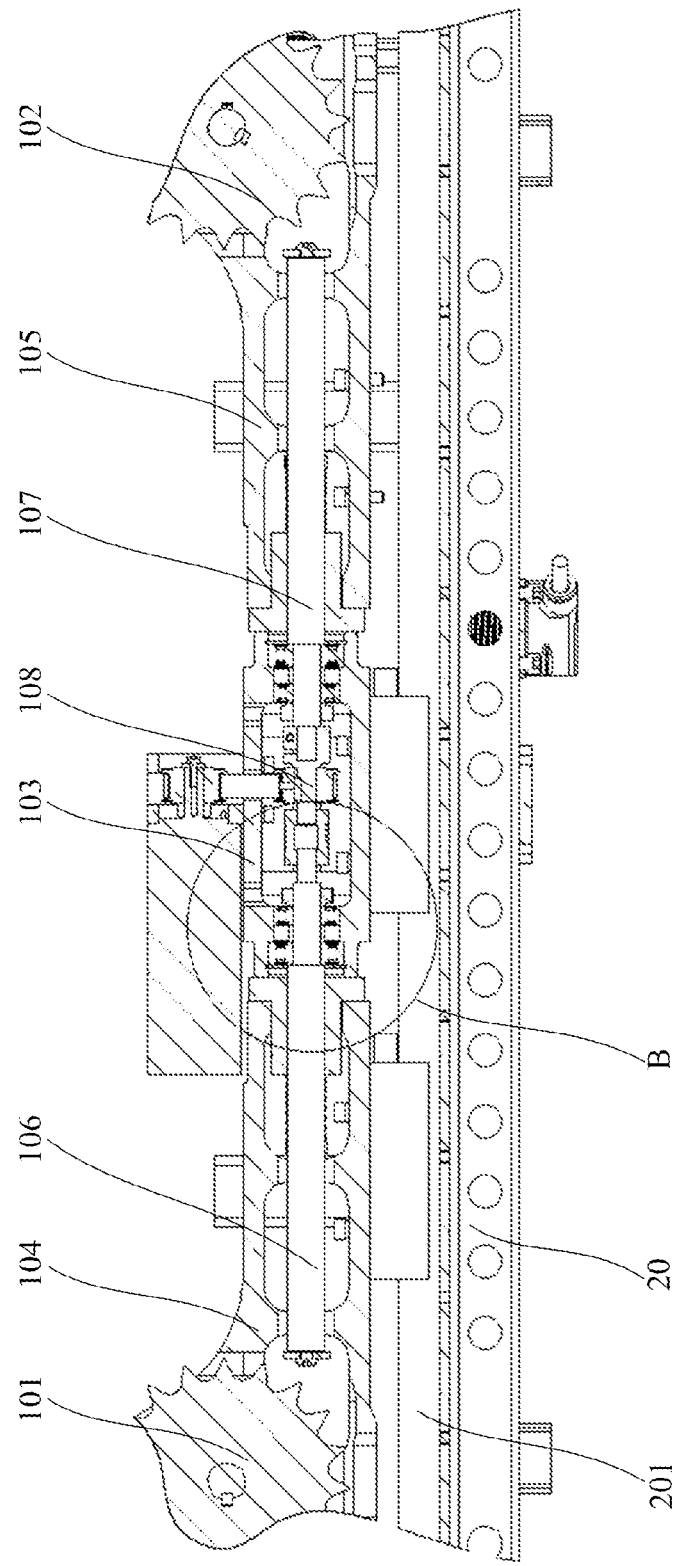
FIG. 2 is a schematic structural diagram of a first climbing unit in the warehousing robot provided by an embodiment of the present application.
Figure 3:
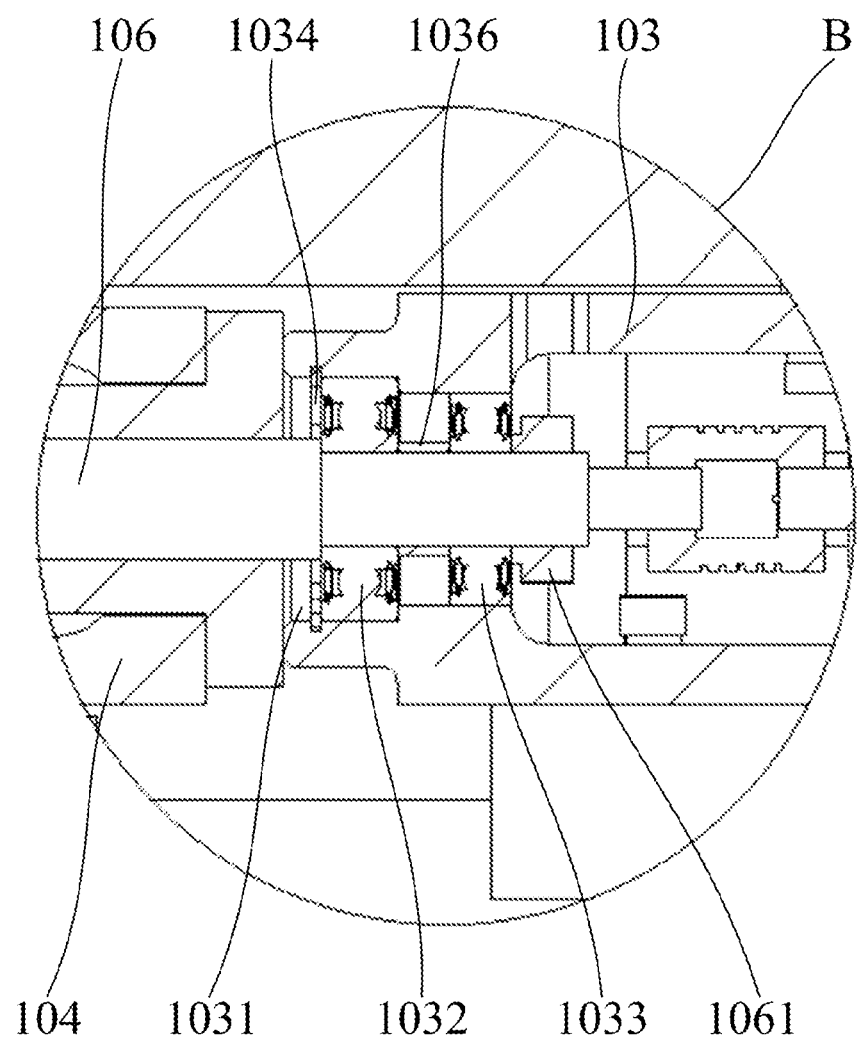
FIG. 3 is a partial enlarged view of B of FIG. 2.
Figure 4:
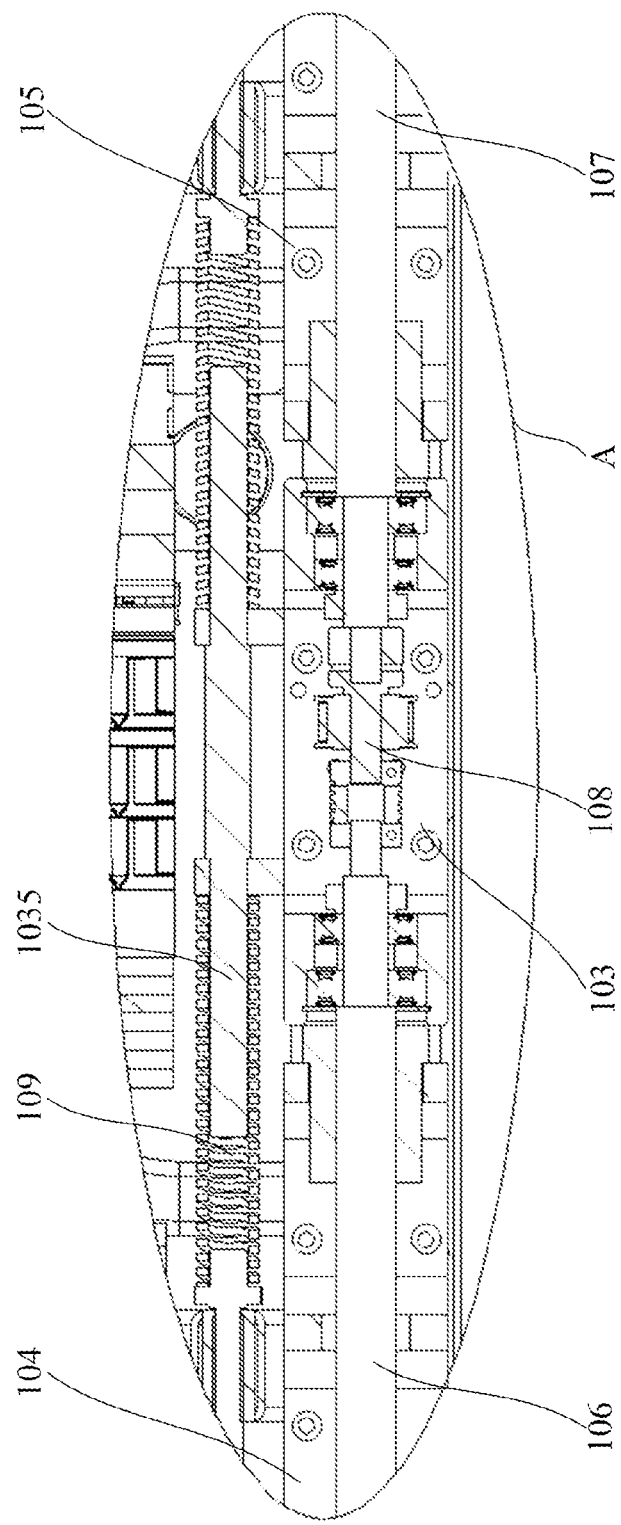
FIG. 4 is a partial enlarged view of A of FIG. 1.
Figure 5:
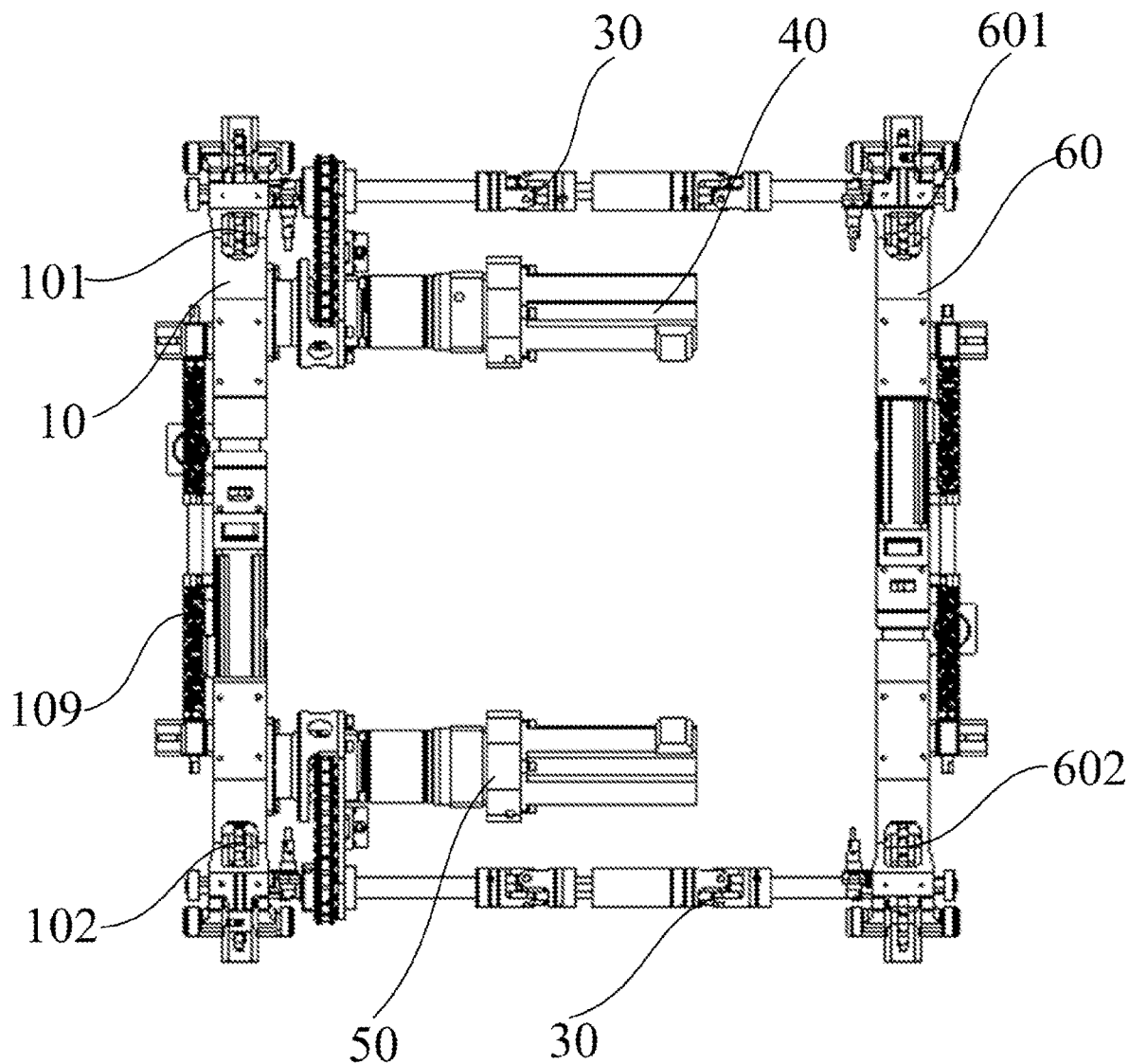
FIG. 5 is a schematic diagram of the connection between a first climbing unit and a second climbing unit of the warehousing robot provided by an embodiment of the present application.
Figure 6:
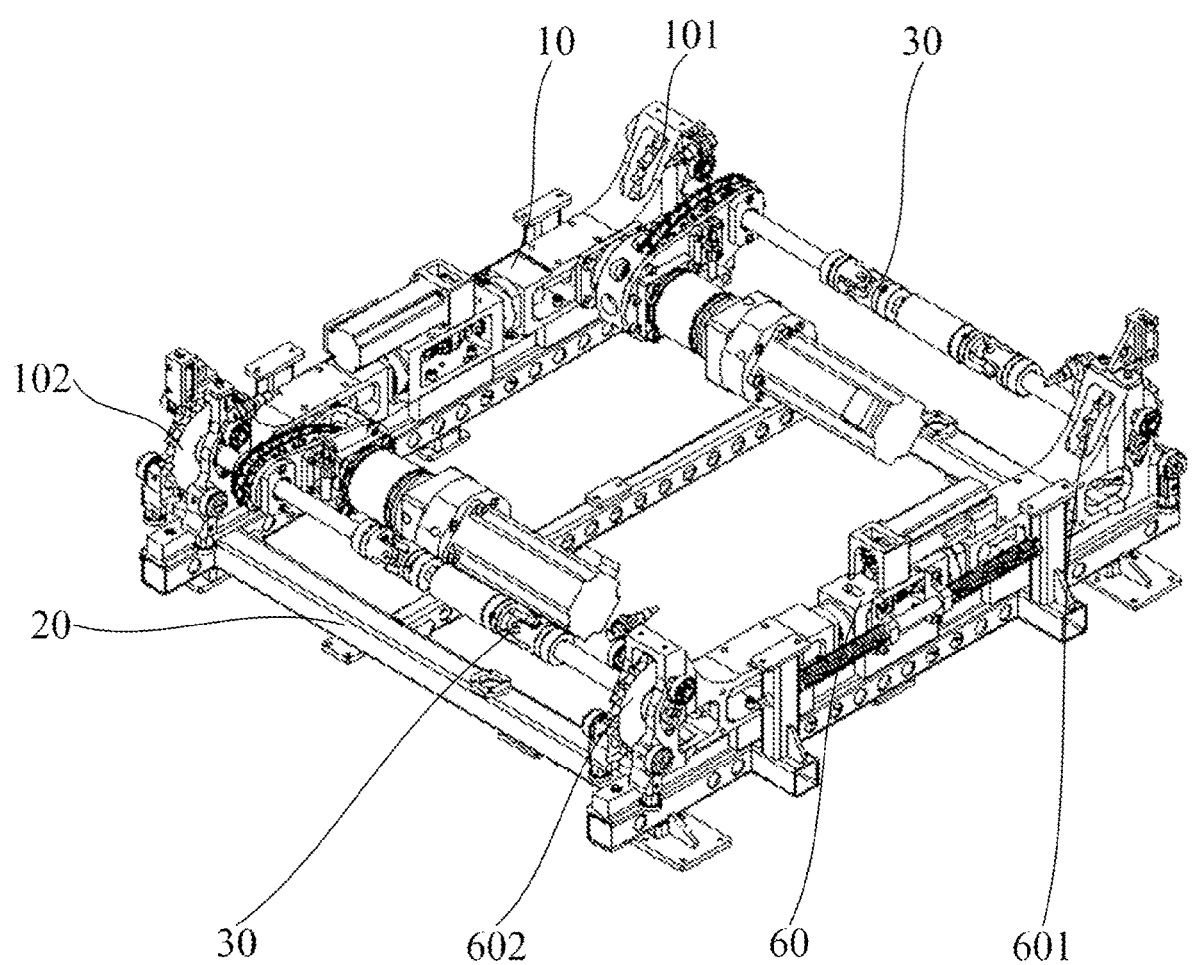
FIG. 6 is a schematic diagram of the connection between a climbing component and a underframe of the warehousing robot provided by an embodiment of the present application.
Figure 7:
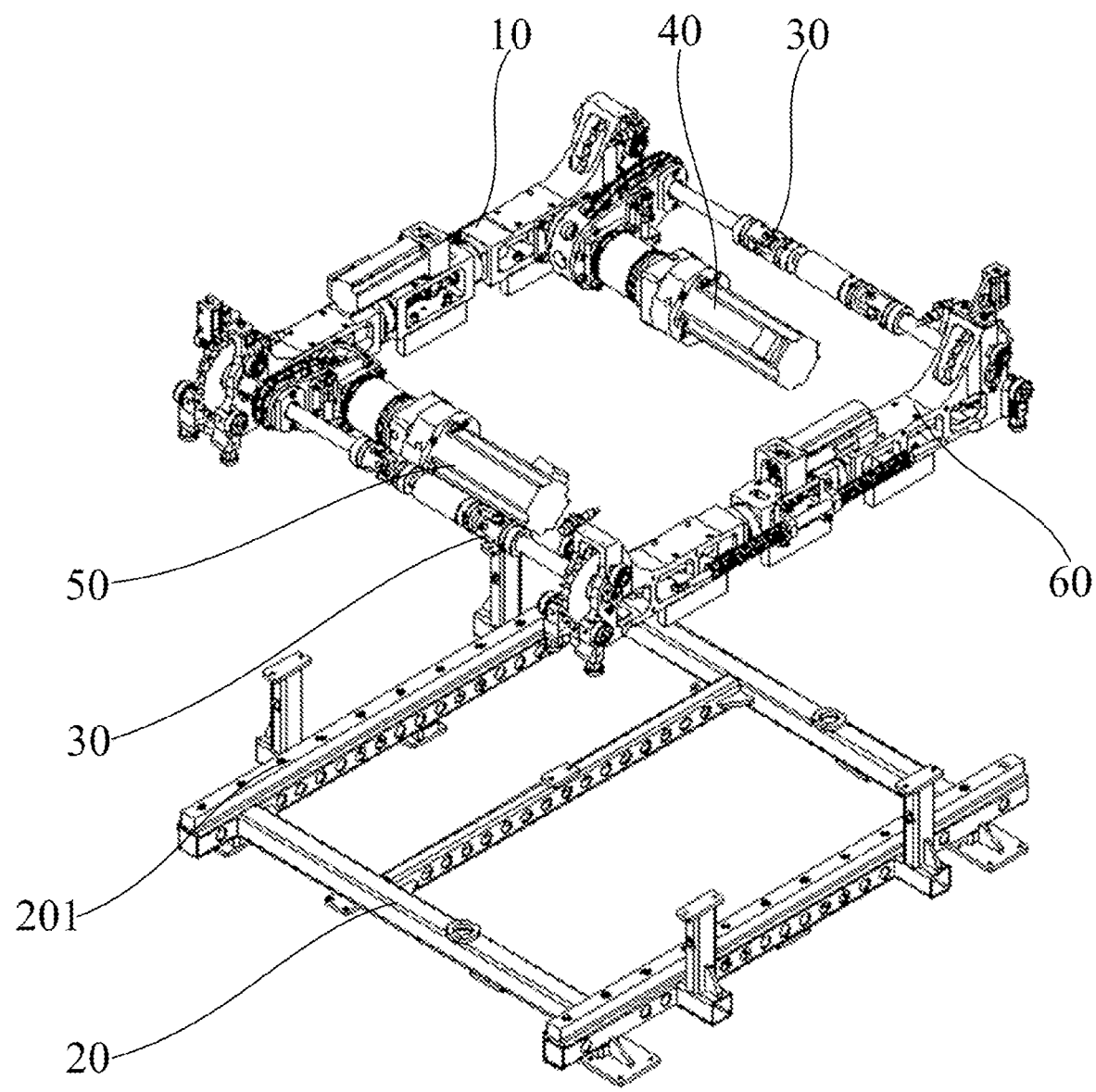
FIG. 7 is an explosive view of the warehousing robot provided by an embodiment of the present application.

FIG. 1 is a schematic structural diagram of a warehousing robot provided by an embodiment of the present application; FIG. 2 is a schematic structural diagram of a first climbing unit in the warehousing robot provided by an embodiment of the present application; FIG. 3 is a partial enlarged view of B of FIG. 2; FIG. 4 is a partial enlarged view of A of FIG. 1; FIG. 5 is a schematic diagram of the connection between a first climbing unit and a second climbing unit of the warehousing robot provided by an embodiment of the present application; FIG. 6 is a schematic diagram of the connection between a climbing component and a underframe of the warehousing robot provided by an embodiment of the present application; FIG. 7 is an explosive view of the warehousing robot provided by an embodiment of the present application; and FIG. 8 is a schematic diagram of the cooperation between the warehousing robot and the track provided by an embodiment of the present application.

Please refer to FIG. 1 to FIG. 7, this embodiment provides a warehousing robot, including a climbing component and an underframe 20; the climbing component is configured to dock with the track on the shelf, and drive the warehousing robot to climb along the shelf after completing a docking; and the climbing component is slidably connected with the underframe 20 to enable the climbing component to slide relative to the underframe 20 along a preset direction in a horizontal plane during a docking process of the climbing component and the track.

Figure 8:
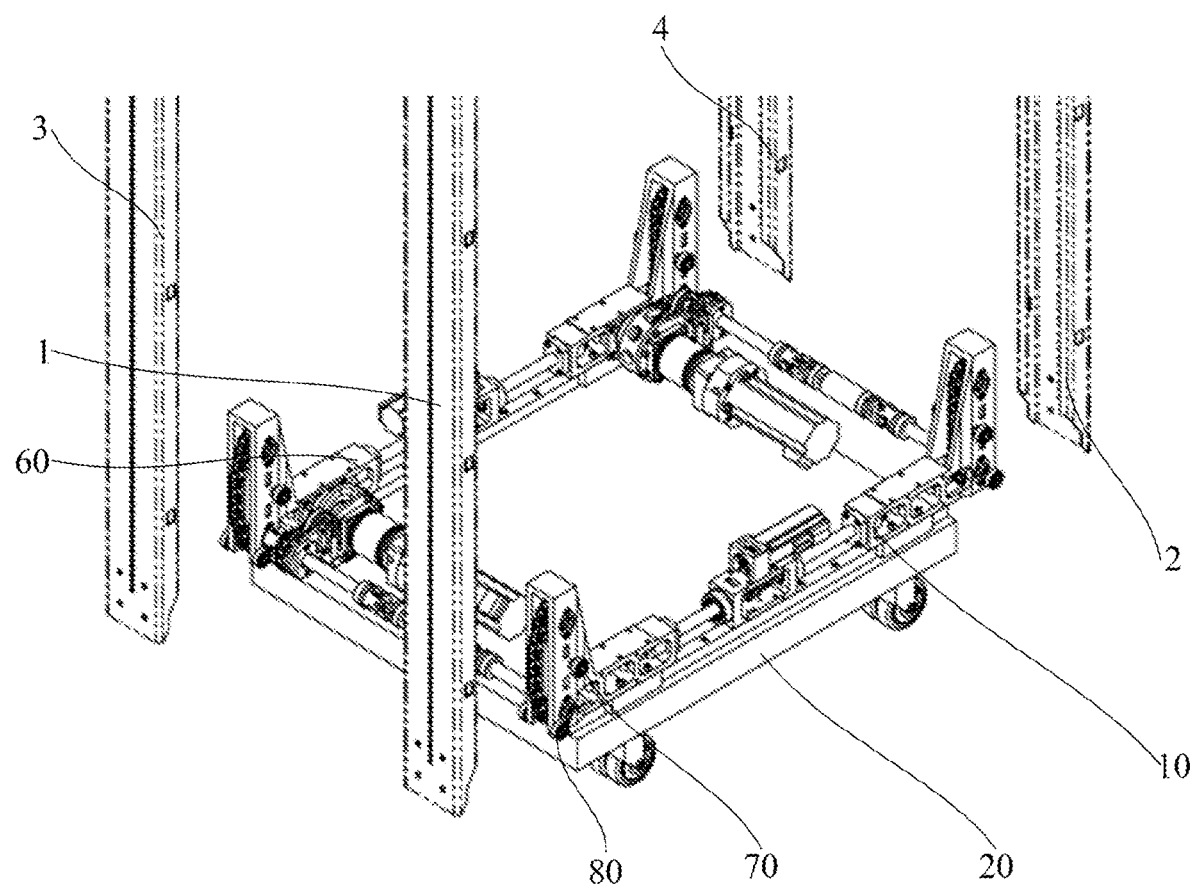
FIG. 8 is a schematic diagram of the cooperation between the warehousing robot and the track provided by an embodiment of the present application.

Continuing to refer to FIG. 8, in this embodiment, a first driving wheel 101, a second driving wheel 102, a third driving wheel 601, and a fourth driving wheel 602 are arranged on the climbing component. The climbing component is docked with the track to cooperate each driving wheel with the different track on the shelf Exemplarily, a first climbing track 1, a second climbing track 2, a third climbing track 3, and a fourth climbing track 4 are arranged on the shelf, when the warehousing robot climbs the shelf, the first driving wheel 101 is cooperated with the first climbing track 1, the second driving wheel 102 is cooperated with the second climbing track 2, the third driving wheel 601 is cooperated with the third climbing track 3, and the fourth driving wheel 602 is cooperated with the fourth climbing track 4.

Further, the warehousing robot also includes a power apparatus, and the power apparatus is connected with the first driving wheel 101, the second driving wheel 102, the third driving wheel 601, and the fourth driving wheel 602 in a transmission way. When the warehousing robot climbs the shelf, the power apparatus drives the first driving wheel 101, the second driving wheel 102, the third driving wheel 601, and the fourth driving wheel 602 to rotate, to drive the whole warehousing robot to move along a direction perpendicular to a vertical direction.

In this embodiment, a walking mechanism is arranged on the underframe 20, and the walking mechanism is configured to drive the warehousing robot to move on the ground.

In this embodiment, the climbing component is slidably connected with the underframe 20. Specifically, a sliding rail 201 with a center line parallel to the preset direction may be arranged on the underframe 20, and the climbing component is slidably connected with the sliding rail 201. Of course, a sliding column with a center line parallel to the preset direction may also be arranged on the underframe 20, a sliding hole is arranged on the climbing component correspondingly, and the sliding column is inserted into the sliding hole, which can also realize the sliding connection between the underframe 20 and the climbing component.

In this embodiment, the climbing component includes a body 103 and a climbing unit, the climbing unit is arranged on the body 103 and the body 103 is slidably connected with the underframe 20. The climbing unit has the telescopic mechanism and the first driving wheel 101 and the second driving wheel 102 arranged along the preset direction, the first driving wheel 101 and the second driving wheel 102 are arranged at both ends of the telescopic mechanism, to dock with the track under the driving action of the telescopic mechanism.

Specifically, the climbing component includes a first climbing unit 10, the first climbing unit 10 has the telescopic mechanism and the first driving wheel 101 and the second driving wheel 102 arranged along the preset direction, and the first driving wheel 101 and the second driving wheel 102 is configured to dock with the track; and the first driving wheel 101 and the second driving wheel 102 are arranged at both ends of the telescopic mechanism, to dock with the track under the driving action of the telescopic mechanism. The telescopic mechanism is configured to adjust a distance between the first driving wheel 101 and the second driving wheel 102 along the preset direction, so that the first driving wheel 101 and the second driving wheel 102 are docked with corresponding track. Specifically, the climbing component in this embodiment further includes a second climbing unit 60, the second climbing unit 60 and the first climbing unit 10 are set at an interval along the vertical direction of the preset direction, the first climbing unit 10 and the second climbing unit 60 are located in a same horizontal plane, and the second climbing unit 60 includes the third driving wheel 601 and the fourth driving wheel 602. The first climbing unit 10 and the second climbing unit 60 jointly drive the warehousing robot to climb the shelf. Further, the second climbing unit 60 also includes a telescopic mechanism, and the telescopic mechanism is configured to adjust a distance between the third driving wheel 601 and the fourth driving wheel 602. The distance between the first driving wheel 101 and the second driving wheel 102 and the distance between the third driving wheel 601 and the fourth driving wheel 602 can be adjusted by the telescopic mechanism, so that the first climbing unit 10 is suitable for shelves with different distances between the first climbing track 1 and the second climbing track 2, and the second climbing unit 60 is suitable for shelves with different distances between the third climbing track 3 and the fourth climbing track 4 at the same time, which improves versatility of the warehousing robot.

Continuing to refer to FIG. 8, in this embodiment, the preset direction is a direction in the plane where the center lines of the first climbing track 1 and the second climbing track 2 are located and perpendicular to the center line of the first climbing track 1.

The climbing unit includes: a first sliding part 104 and a second sliding part 105, the first driving wheel 101 is arranged on the first sliding part 104, the second driving wheel 102 is arranged on the second sliding part 105. The telescopic mechanism is connected with the first sliding part 104 and the second sliding part 105, to drive the first sliding part 104 and the second sliding part 105 to move along the preset direction.

Specifically, the first climbing unit 10 includes: the body 103, the first sliding part 104 and the second sliding part 105. The body 103 is slidably connected with the underframe 20, the first driving wheel 101 is arranged on the first sliding part 104, and the second driving wheel 102 is arranged on the second sliding part 105; and the telescopic mechanism is connected with the body 103, the first sliding part 104 and the second sliding part 105, to drive the first sliding part 104 and the second sliding part 105 to move along the preset direction.

The telescopic mechanism can drive the first sliding part 104 and the second sliding part 105 to move towards opposite directions. Compared with the telescopic mechanism only driving the first sliding part 104 to move, it can quickly adjust the distance between the first driving wheel 101 and the second driving wheel 102. In addition, based on the movement of the first sliding part 104, the second sliding part 105 also moves, which can increase the adjustment range of the distance between the first driving wheel 101 and the second driving wheel 102.

Specifically, in order to ensure that the warehousing robot can be driven to move when the first driving wheel 101 rotates, the first driving wheel 101 may be a chain wheel. Correspondingly, a chain is arranged on the first climbing track 1, the chain wheel cooperates with the chain, to drive the warehousing robot to move when the chain wheel rotates; or the first driving wheel 101 is a gear, at this time, a rack can be arranged on the first climbing track 1, and the gear cooperates with the rack, to drive the warehousing robot to move when the gear rotates. Similarly, a structure of the second driving wheel 102 may be the same as that of the first driving wheel 101. Refer to the description of the first driving wheel 101, which will not be repeated here.

A working process of the warehousing robot provided in this embodiment is as follows: the warehousing robot is driven by the walking mechanism on the underframe 20 to move until the first climbing unit 10 is located between the first climbing track 1 and the second climbing track 2 and the second climbing unit 60 is located between the third climbing track 3 and the fourth climbing track 4. After that, the first sliding part 104 and the second sliding part 105 are driven to move along the preset direction by the telescopic mechanism, to adjust the distance between the first driving wheel 101 and the second driving wheel 102, so that the first driving wheel 101 is cooperated with the first climbing track 1, and the second driving wheel 102 is cooperated with the second climbing track 2. In the above process, the distance between the third driving wheel 601 and the fourth driving wheel 602 is adjusted by the telescopic mechanism on the second climbing unit 60, so that the third driving wheel 601 is cooperated with the third climbing track 3, and the fourth driving wheel 602 is cooperated with the fourth climbing track 4. And then, the first driving wheel 101, the second driving wheel 102, the third driving wheel 601, and the fourth driving wheel 602 are driven to rotate by the power apparatus, and then the warehousing robot is driven to move along the direction perpendicular to the horizontal plane. If the distance between the warehousing robot and the first climbing track 1 is less than the distance between the warehousing robot and the second climbing track 2, after the first driving wheel 101 contacts with the first climbing track 1, the body 103 will be enabled to move towards the second climbing track 2 until the second driving wheel 102 contacts with the second climbing track 2. On the contrary, if the distance between the warehousing robot and the first climbing track 1 is greater than the distance between the warehousing robot and the second climbing track 2, after the second driving wheel contacts with the second climbing track 2, the body 103 will be enabled to move towards the first climbing track 1 until the first driving wheel 101 contacts with the first climbing track 1.

For the warehousing robot provided in this embodiment, the climbing component is slidably connected with the underframe 20, and the climbing component is configured to dock with the track on the shelf, and drive the warehousing robot to climb along the shelf after completing a docking. Compared with the fixed connection of the climbing component and the underframe 20, when the distance between the warehousing robot and the first climbing track 1 is not equal to the distance between the warehousing robot and the second climbing track 2, the position of the driving wheel on the climbing component can be adjusted, so that the driving wheel is docked with the track, and the climbing component will slide on the underframe 20 without dragging the underframe 20 to move on the ground, thereby avoiding damage to the walking mechanism and improving the service life.

Continuing to refer to FIG. 1 to FIG. 4, in this embodiment, the first sliding part 104 and the second sliding part 105 are also slidably connected with the sliding rail 201. The first sliding part 104 and the second sliding part 105 may be further fixed, to improve stationarity of the movement of the first sliding part 104 and the second sliding part 105.

In this embodiment, the telescopic mechanism may include a telescopic cylinder and/or a lead screw. When the telescopic mechanism includes the telescopic cylinder, the telescopic mechanism may include a first telescopic cylinder, a piston rod of the first telescopic cylinder is connected with the first sliding part 104, a cylinder body of the first telescopic cylinder is connected with the body 103, and a center line of the first telescopic cylinder is parallel to a preset direction. When the piston rod extends from the cylinder body or the piston rod retracts to the cylinder body, the first sliding part 104 can be driven to move along the preset direction. The telescopic mechanism may also include a second telescopic cylinder, a cylinder body of the second telescopic cylinder is connected with the body 103, the piston rod of the second telescopic cylinder is connected with the second sliding part 105, and a center line of the second telescopic cylinder is parallel to a preset direction. When the piston rod extends from or retracts to the cylinder body, the second sliding part 105 can be driven to move, so as to adjust the distance between the first driving wheel 101 and the second driving wheel 102. Where the first telescopic cylinder and the second telescopic cylinder may be hydraulic cylinders or pneumatic cylinders.

In this embodiment, when the telescopic mechanism includes the lead screw, the telescopic mechanism may include a first lead screw 106 and a driving apparatus arranged on the body 103, an axis of the first lead screw 106 is parallel to the preset direction, and a first threaded hole cooperated with the first lead screw 106 is arranged on the first sliding part 104. The first lead screw 106 can be rotatably connected with the body 103, and the driving apparatus is connected with the first lead screw 106 in a transmission way, to drive the first lead screw 106 to rotate.

Continuing to refer to FIG. 2 and FIG. 3, a bearing hole 1031 is arranged on the body 103, the bearing hole 1031 includes a first hole section facing the first sliding part 104 and a second hole section facing the second sliding part 105, and an aperture of the second hole section is less than an aperture of the first hole section; a first rolling bearing 1032 is arranged in the first hole section, a second rolling bearing 1033 is arranged in the second hole section; and an end of the first lead screw 106 facing the body 103 has a journal which is inserted into an inner ring of the first rolling bearing 1032 and the second rolling bearing 1033, to realize a rotatable connection between the first lead screw 106 and the body 103. Taking an orientation shown in FIG. 2 as an example, since the aperture of the second hole section is less than the aperture of the first hole section, a left end of the second hole section can prevent the first rolling bearing 1032 from moving towards the right, further prevent the first lead screw 106 from moving towards the right. In order to prevent the first lead screw 106 from moving towards the left, a backstop ring 1034 is clamped on the inner wall of the first hole section, the backstop ring 1034 is located on the left side of the first rolling bearing 1032, the backstop ring 1034 can prevent the first rolling bearing 1032 from moving towards the left. A backstop part 1061 is arranged at the right end of the journal, the backstop part 1061 presses against the inner ring of the second rolling bearing 1033, at the same time, a casing pipe 1036 is arranged between the first rolling bearing 1032 and the second rolling bearing 1033, the casing pipe 1036 presses against the inner ring of the first rolling bearing 1032 and the inner ring of the second rolling bearing 1033, the backstop part 1061 can press against the backstop ring 1034 through the second rolling bearing 1033, the casing pipe 1036 and the first rolling bearing 1032, to prevent the first lead screw 106 from moving towards the left.

Continuing to refer to FIG. 2, when the telescopic mechanism includes the lead screw, the telescopic mechanism also includes a second lead screw 107, an axis of the second lead screw 107 is parallel to the preset direction, and a second thread hole cooperated with the second lead screw 107 is arranged on the second sliding part 105; and the second lead screw 107 is rotatably connected with the body 103, and the driving apparatus is connected with the second lead screw 107 in a transmission way, to drive the second lead screw 107 to rotate.

In this embodiment, a connection mode between the second lead screw 107 and the body 103 is substantially the same as a connection mode between the first lead screw 106 and the body 103. Refer to the description of the connection mode between the first lead screw 106 and the body 103, which will not be repeated here.

Of course, in this embodiment, the first sliding part 104 may be connected with the body 103 through the telescopic cylinder, at the same time, the second sliding part 105 is connected with the body 103 through the lead screw; of course, the first sliding part 104 may also be connected with the body 103 through the lead screw, at the same time, the second sliding part 105 is connected with the body 103 through the telescopic cylinder.

In this embodiment, in order to improve strength of the connection between the first sliding part 104 and the body 103, a first sliding hole with a center line parallel to the preset direction may be arranged on the first sliding part 104, correspondingly, a first sliding block is arranged on the body 103, and the first sliding block is slidably arranged in the first sliding hole. Similarly, a second sliding hole with a center line parallel to the preset direction may be arranged on the second sliding part 105, a second sliding block is arranged on the body 103, and the second sliding block is slidably arranged in the second sliding hole.

In an implementation, the driving apparatus can be independently connected with the first lead screw 106 and the second lead screw 107 in a transmission way, to realize independent control of the first lead screw 106 and the second lead screw 107. For example, the driving apparatus includes a first motor connected with the first lead screw 106 in a transmission way, and a second motor connected with the second lead screw 107 in a transmission way. When at work, rotation directions and rotation speeds of the first lead screw 106 and the second lead screw 107 may be the same or different, that is, moving directions and moving speeds of the first sliding part 104 and the second sliding part 105 may be the same or different.

In the other implementation, the driving apparatus includes: the rotating apparatus and a drive shaft 108, an axis of the drive shaft 108, the axis of the first lead screw 106, and the axis of the second lead screw 107 are arranged collinearly, one end of the drive shaft 108 is connected with the first lead screw 106 in a transmission way, and the other end of the drive shaft 108 is connected with the second lead screw 107 in a transmission way. The rotating apparatus is arranged on the body 103, and the rotating apparatus is connected with the drive shaft 108 in a transmission way, to drive the drive shaft 108 to rotate. The first lead screw 106 and the second lead screw 107 can be driven to rotate synchronously through the drive shaft 108, that is, the first sliding part 104 and the second sliding part 105 can be driven to move towards the body 103 at the same time, or to move away from the body 103 at the same time at the same moving speed. Such arrangement can ensure that the distance between the first sliding part 104 and the body 103 is equal to the distance between the second sliding part 105 and the body 103, and keep a center of gravity of the warehousing robot stable while adjusting the distance between the first driving wheel 101 and the second driving wheel 102.

Specifically, the driving shaft 108 may be connected with the first lead screw 106 and the second lead screw 107 through a universal coupling.

Continuing to refer to FIG. 8, in this embodiment, the telescopic mechanism is a non-self-locking mechanism, and the two ends of the telescopic mechanism are provided with position-limiting parts which are configured to cooperate with the guiding parts on the shelf to realize the limitation of positions of the first driving wheel 101 and the second driving wheel 102 along a preset direction. The position-limiting parts and the guiding parts are cooperated, in the process of warehousing robot climbing the shelf, if the distance between the first climbing track 1 and the second climbing track 2 is shortened, and then the position-limiting parts will be squeezed, the distance between the first driving wheel 101 and the second driving wheel 102 is appropriately reduced; and if the distance between the first climbing track 1 and the second climbing track 2 is increased, and then the position-limiting parts are pulled. The distance between the first driving wheel 101 and the second driving wheel 102 is appropriately increased, which can avoid the first driving wheel 101 and the second driving wheel 102 being separated from the track or too much squeezing force to the first driving wheel 101 and the second driving wheel 102.

Specifically, the position-limiting parts include a first guide wheel 70 and a second guide wheel 80 set at an interval along a preset direction, and the guiding part is sandwiched between the first guide wheel 70 and the second guide wheel 80. The first guide wheel 70 and the second guide wheel 80 can rotate, so that the friction between the guiding part and the first guide wheel 70 as well as the second guide wheel 80 is small, thereby reducing the resisting force during climbing.

In an implementation, the first guide wheel 70 and the second guide wheel 80 are set at an interval on the first sliding part 104, correspondingly, the first guide wheel 70 and the second guide wheel 80 are also arranged on the second sliding part 105. The guiding part is a backstop plate arranged on the track, and the first guide wheel 70 and the second guide wheel 80 are sandwiched on both sides of the backstop plate.

Specifically, the first lead screw 106 and the second lead screw 107 may be non-self-locking lead screws. When the first sliding part 104 is subjected to a force along the preset direction, the first lead screw 106 will rotate, and the first sliding part 104 will move along the direction of the force. Similarly, when the second sliding part 105 is subjected to a force along the preset direction, the second lead screw 107 will rotate, and the second sliding part 105 will move along the direction of the force. With this arrangement, in the process of the warehousing robot climbing the shelf, if the distance between the first climbing track 1 and the second climbing track 2 is shortened, the position-limiting parts on the first sliding part 104 and the second sliding part 105 are squeezed, and the distance between the first sliding part 104 and the second sliding part 105 can be appropriately shortened by the rotation of the first lead screw 106 and the second lead screw 107, to avoid too much squeezing force. In the process of the warehousing robot climbing the shelf, if the distance between the first climbing track 1 and the second climbing track 2 is increased, the position-limiting parts on the first sliding part 104 and the second sliding part 105 are pulled, and the distance between the first sliding part 104 and the second sliding part 105 can be appropriately increased by the rotation of the first lead screw 106 and the second lead screw 107, to avoid the first driving wheel 101 and the second driving wheel 102 being separated from the corresponding climbing track. Exemplarily, the first lead screw 106 and the second lead screw 107 may be ball screws, or other lead screws with a friction angle smaller than a helix angle. It is worth noting that after the first driving wheel 101 and the second driving wheel 102 are docked with the track, the rotating apparatus connected with the first lead screw 106 and the second lead screw 107 in a transmission way is also a non-self-locking apparatus, that is, the first lead screw 106 and the second lead screw 107 are allowed to rotate freely.

The rotating apparatus is not restricted in this embodiment, as long as the rotating apparatus can drive the drive shaft 108 to rotate. For example, the rotating apparatus may include a rotating motor, and a main shaft of the rotating motor is connected with the drive shaft 108 in a transmission way. Specifically, a first pulley is arranged on the drive shaft 108, a second pulley is arranged on the main shaft of the rotating motor, and a transmission belt cooperates with the first pulley and the second pulley, to realize the transmission connection between the rotating motor and the drive shaft 108. In order to avoid sliding between the transmission belt and the first pulley as well as the second pulley, the transmission belt can be a synchronous belt, and the corresponding first pulley and the second pulley are toothed pulleys.

In an implementation, the warehousing robot further includes a sensor, configured to detect the pressure to the first driving wheel 101 and the second driving wheel 102 from the track, so as to control the telescopic mechanism to telescope. When the pressure to the first driving wheel 101 and the second driving wheel 102 from the track reaches a preset value, the telescopic mechanism is controlled to stop working. After the first driving wheel 101 is docked with the first climbing track 1, and the second driving wheel 102 is docked with the second climbing track 2, the telescopic mechanism is controlled to stop working, so as to avoid too much resisting force to the first driving wheel 101 from the first climbing track 1 and too much resisting force to the second driving wheel 102 from the second climbing track 2.

It is worth noting that the preset value is a minimum pressure to the first driving wheel 101 when ensuring that the first driving wheel 101 is docked with the first climbing track 1 and the second driving wheel 102 is docked with the second climbing track 2.

Specifically, the sensor may be a pressure sensor arranged on the first driving wheel 101 and/or the second driving wheel 102.

In other embodiments, the warehousing robot further includes a torque detection apparatus, the torque detection apparatus is configured to detect the torque of the rotating apparatus, to control the telescopic mechanism to telescope. Exemplarily, when the pressure to the first driving wheel 101 reaches a preset value, the torque corresponding to the rotating apparatus is the preset torque. Therefore, when the torque of the rotating apparatus is detected to reach the preset torque, the rotating motor is controlled to stop rotating. In the process of climbing the shelf, if it is detected that the torque of the rotating apparatus is less than the preset torque, the distance between the first driving wheel 101 and the second driving wheel 102 is appropriately increased through the telescopic mechanism, to avoid the first driving wheel 101 and the second driving wheel 102 being separated from the corresponding climbing track.

The warehousing robot provided in this embodiment may include a controller which is connected with the sensor or the torque detection apparatus, to control the telescopic mechanism to work according to data provided by the sensor or the torque detection apparatus.

In this embodiment, the rotating apparatus may be the rotating motor, the corresponding torque detection apparatus is configured to detect the torque of the rotating motor.

The docking process of the warehousing robot and the climbing track provided in this embodiment is as follows: the warehousing robot moves until the first climbing unit 10 is located between the first climbing track 1 and the second climbing track 2, the second climbing unit 60 is located between the third climbing track 3 and the fourth climbing track 4, then the first lead screw 106 and the second lead screw 107 are driven to rotate by the rotating motor, and then the first sliding part 104 and the second sliding part 105 are driven to move away from the body 103, so that the first driving wheel 101 contacts with the first climbing track 1, and the second driving wheel 102 contacts with the second climbing track 2. When it is detected that the torque of the rotating motor reaches the preset value, the rotating motor is controlled to stop working. At this time, the first driving wheel 101 is docked with the first climbing track 1, and the second driving wheel 102 is docked with the second climbing track 2. In the above process, the distance between the third driving wheel 601 and the fourth driving wheel 602 is adjusted by the telescopic mechanism on the second climbing unit 60, so that the third driving wheel 601 is docked with the third climbing track 3, and the fourth driving wheel 602 is docked with the fourth climbing track 4.

In this embodiment, the warehousing robot further includes an elastomer which is connected with the body 103 and the underframe 20, and the elastomer undergoes elastic deformation when the body 103 slides along the preset direction. When the relative move between the body 103 and the underframe 20 occurs, the elastomer undergoes elastic deformation. When the warehousing robot climbs the shelf to separate the underframe 20 from the ground, the body 103 and the underframe 20 return to an initial position under the action of the elastic force of the elastomer. Where the initial position is the relative position between the underframe 20 and the body 103 when the elastomer is not elastically deformed.

Specifically, there may be various kinds of elastomers, for example, the elastomer may include a rubber block connected with the body 103 and the underframe 20, or the elastomer may include an elastic strip connected with the body 103 and the underframe 20. In this embodiment, the elastomer includes a spring 109, a center line of the spring 109 is parallel to a preset direction, one end of the spring 109 is connected with the body 103, and the other end of the spring 109 is connected with the underframe 20. Compared with the rubber block, the spring 109 has a longer service life.

Further, the number of the springs 109 is two; and two spring connectors are set at an interval on the body 103 along the preset direction, one end of each spring 109 is connected with one spring connector, and the other end of each spring 109 is connected with the underframe 20. When the body 103 moves relative to the underframe 20, the two springs 109 both undergo elastic deformation. Compared with only one spring 109 set, the elastic force is increased and time for the body 103 and the underframe 20 to return to the initial position is shortened.

Continuing to refer to FIG. 4, in this embodiment, the spring connector includes a column 1035 with a center line parallel to the preset direction, and a part of the spring 109 is sleeved on the column 1035. When the spring 109 is compressed, the column 1035 can play a guiding role, to avoid the spring 109 tilting after being subjected to a force.

Continuing to refer to FIG. 5 to FIG. 8. In this embodiment, the climbing component includes two climbing units set at an interval along the vertical direction of the preset direction. The first driving wheels 101 of the two climbing units are connected by a universal coupling 30, and the second driving wheels 102 of the two climbing units are connected by the universal coupling 30.

Specifically, the climbing component includes a first climbing unit 10 and a second climbing unit 60 set at an interval along the vertical direction of the preset direction, the first driving wheel 101 and the second driving wheel 102 are arranged on the first climbing unit 10, and the third driving wheel 601 and the fourth driving wheel 602 are arranged on the second climbing unit 60. The first driving wheel 101 and the third driving wheel 601 are connected by the universal coupling 30, and the second driving wheel 102 and the fourth driving wheel 602 are connected by the universal coupling 30. Such arrangement can avoid the third driving wheel 601 and the fourth driving wheel 602 on the second climbing unit 60 being affected when the first climbing unit 10 adjusts the distance between the first driving wheel 101 and the second driving wheel 102, that is, the distance between the two driving wheels on different climbing units can be adjusted independently.

Continuing to refer to FIG. 5 and FIG. 8, four climbing tracks are arranged on the shelf, and each driving wheel on the first climbing unit 10 and the second climbing unit 60 is docked with one climbing track. The power apparatus may include a first driving motor 40 which is connected with the first driving wheel 101 on the first climbing unit 10 in a transmission way, and a second driving motor 50 which is connected with the second driving wheel 102 on the first climbing unit 10 in a transmission way.

In this embodiment, the structures of the first climbing unit 10 and the second climbing unit 60 are substantially the same. Refer to the description of the first climbing unit 10, which will not be repeated here.

Finally, it should be noted that the above embodiments are merely intended to illustrate the technical solutions of the present application, rather than limiting them. Although the present application has been described in detail with reference to the foregoing embodiments, those of ordinary skilled in the art should understand that it is still possible to modify the technical solutions described in the foregoing embodiments, or to equivalently replace some or all of the technical features thereof; and these modifications or substitutions do not preclude the nature of the respective technical solutions from the scope of the technical solutions of the embodiments of the present application.

What is claimed is:

1. A warehousing robot, comprising: a climbing component and an underframe, wherein the climbing component is configured to dock with a track on a shelf, and drive the warehousing robot to climb along the shelf after completing a docking; and the climbing component is slidably connected with the underframe to enable the climbing component to slide relative to the underframe along a preset direction in a horizontal plane during a docking process of the climbing component and the track, wherein the climbing component comprises a body and a climbing unit, the climbing unit is arranged on the body, and the body is slidably connected with the underframe;

wherein the warehousing robot further comprises an elastomer, the elastomer connects with the body and the underframe, and undergoes elastic deformation when the body slides relative to the underframe along a preset direction.

2. The warehousing robot according to claim 1, wherein the climbing unit has a telescopic mechanism and a first driving wheel and a second driving wheel arranged along a preset direction; and the first driving wheel and the second driving wheel are arranged at both ends of the telescopic mechanism, to dock with the track under driving action of the telescopic mechanism.

3. The warehousing robot according to claim 2, wherein the climbing unit comprises: a first sliding part and a second sliding part, the first driving wheel is arranged on the first sliding part, and the second driving wheel is arranged on the second sliding part; and the telescopic mechanism is slidably connected with the first sliding part and the second sliding part, to drive the first sliding part and the second sliding part to move along a preset direction.

4. The warehousing robot according to claim 3, wherein the telescopic mechanism comprises a first lead screw, a second lead screw and a driving apparatus arranged on the body, an axis of the first lead screw is parallel to the preset direction, and a first threaded hole cooperated with the first lead screw is arranged on the first sliding part; and the first lead screw is rotatably connected with the body;

an axis of the second lead screw is parallel to a preset direction, and a second threaded hole cooperated with the second lead screw is arranged on the second sliding part; and the second lead screw is rotatably connected with the body; and the driving apparatus is connected with the first lead screw and the second lead screw in a transmission way.

5. The warehousing robot according to claim 4, wherein the driving apparatus comprises: a rotating apparatus and a drive shaft, an axis of the drive shaft, the axis of the first lead screw and the axis of the second lead screw are arranged collinearly, one end of the drive shaft is connected with the first lead screw in a transmission way, the other end of the drive shaft is connected with the second lead screw in a transmission way, and the rotating apparatus is connected with the drive shaft in a transmission way.

6. The warehousing robot according to claim 5, wherein the rotating apparatus is arranged on the body.

7. The warehousing robot according to claim 5, wherein the climbing component comprises two climbing units set at an interval along a vertical direction of the preset direction.

8. The warehousing robot according to claim 4, wherein the warehousing robot further comprises a torque detection apparatus, and the torque detection apparatus is configured to detect torque of the rotating apparatus, to control the telescopic mechanism to telescope.

9. The warehousing robot according to claim 4, wherein the climbing component comprises two climbing units set at an interval along a vertical direction of the preset direction.

10. The warehousing robot according to claim 3, wherein the climbing component comprises two climbing units set at an interval along a vertical direction of the preset direction.

11. The warehousing robot according to claim 2, wherein the climbing component comprises two climbing units set at an interval along a vertical direction of the preset direction.

12. The warehousing robot according to claim 11, wherein first driving wheels of the two climbing units are connected by a universal coupling.

13. The warehousing robot according to claim 12, wherein second driving wheels of the two climbing units are connected by a universal coupling.

14. The warehousing robot according to claim 2, wherein the warehousing robot further comprises a sensor, configured to detect pressure to the first driving wheel and the second driving wheel from the track, to control the telescopic mechanism to telescope.

15. The warehousing robot according to claim 2, wherein the telescopic mechanism is a non-self-locking mechanism.

16. The warehousing robot according to claim 15, wherein two ends of the telescopic mechanism are provided with position-limiting parts, and the position-limiting parts are configured to cooperate with guiding parts on the shelf to realize limitation of positions of the first driving wheel and the second driving wheel along a preset direction.

17. The warehousing robot according to claim 16, wherein the position-limiting parts comprise a first guide wheel and a second guide wheel set at an interval along a preset direction, and the guiding part is sandwiched between the first guide wheel and the second guide wheel.

18. The warehousing robot according to claim 1, wherein the elastomer comprises springs, and the number of the springs is two; and two spring connectors are set at an interval on the body along a preset direction, one end of each of the springs is connected with one of the spring connectors, and the other end of each of the springs is connected with the underframe.

* * * * *